June 20, 1933.  N. E. BROWN  1,914,733
AGRICULTURAL DEVICE
Filed July 10, 1931
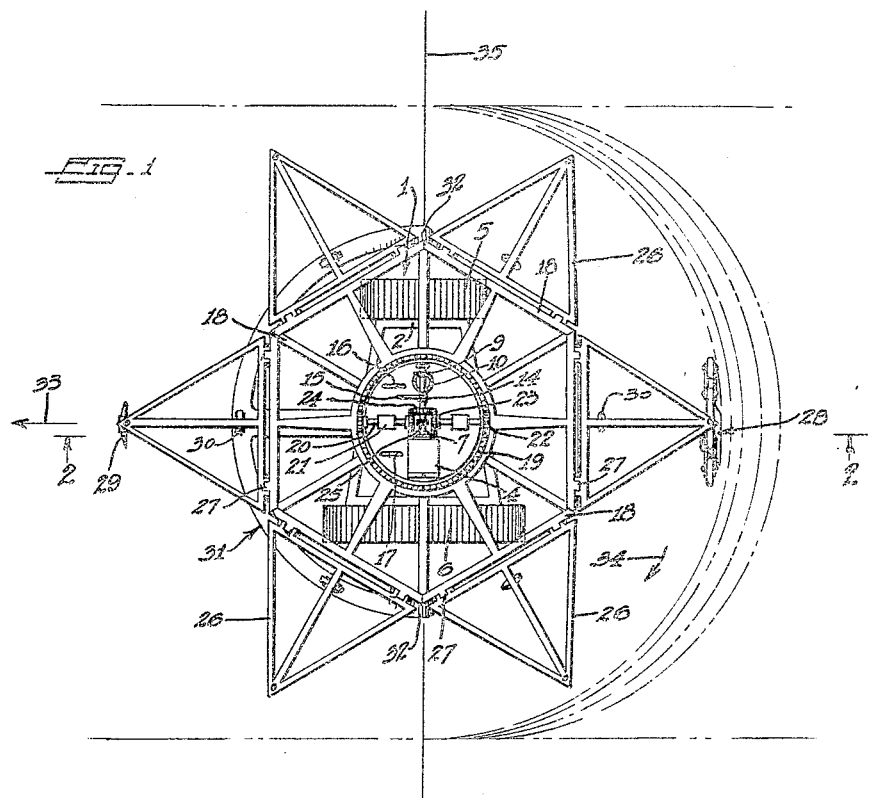
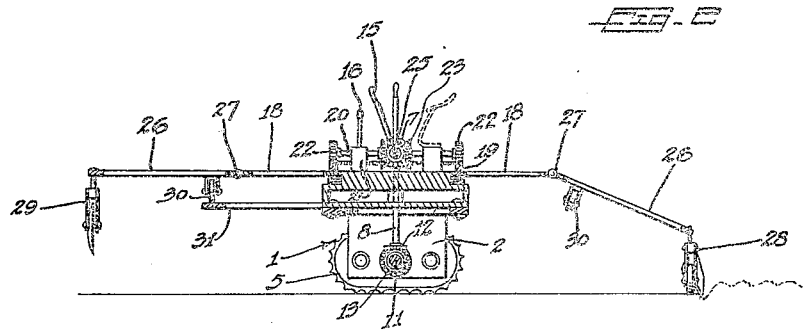
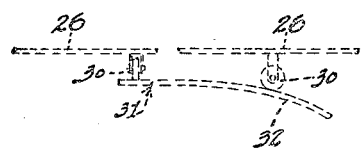
Nat E. Brown
INVENTOR
BY Munn & Co.
ATTORNEYS Patented June 20, 1933

1,914,733

UNITED STATES PATENT OFFICE

NAT ELMER BROWN, OF GRAND HAVEN, MICHIGAN, ASSIGNOR OF ONE-HALF TO JOHN F. JOHNSTON, OF FERRYSBURG, MICHIGAN

AGRICULTURAL DEVICE

Application filed July 10, 1931. Serial No. 550,026.

My invention relates to improvements in agricultural devices, and it consists in the combinations, constructions, and arrangements herein described and claimed.

An object of my invention is to provide an agricultural device which will plow or prepare a maximum area of ground surface with a minimum amount of travel of the device over the ground.

A further object is to provide an agricultural implement which will plow and prepare the ground in one operation.

Another object is to provide an agricultural device which will plow or prepare the ground transversely to its line of travel.

Another object is to provide an agricultural device which will plow up or prepare the ground transversely to its line of travel and having means for preventing the resistance of the ground on the implements carried thereby from swerving the device from its line of travel.

A further object is to provide an agricultural implement which utilizes a common power means for propelling the implement and for preparing the ground transversely to its direction of travel.

Another object is to provide a power driven agricultural device which is adapted for utilizing various forms of agricultural implements.

A further object is to provide a power driven agricultural device adapted for utilizing several types of implements simultaneously.

A further object is to provide a power driven agricultural device which is simple in construction, durable, and efficient for the purpose intended.

Other objects and advantages will appear in the following specification, and the novel features of the invention will be particularly pointed out in the appended claims.

My invention is illustrated in the accompanying drawing, forming part of this application, in which Figure 1 is a top plan view of my device, Figure 2 is a section taken along the line 2—2 of Figure 1, and Figure 3 is a diagrammatic view illustrating the manner in which portions of my device function.

In carrying out my invention I provide a vehicle or tractor 1 comprising a frame 2 having a superstructure 3. A power plant 4 is carried by the superstructure 3. Caterpillar tracks 5 and 6 are carried by the frame 1. It will be noted by referring to Figure 1 that the caterpillar track 5 is smaller than the caterpillar track 6. The purpose of this will be hereinafter explained. A driving shaft 7 is operatively connected with the power plant 4. The driving shaft 7 is operatively associated with a driven shaft 8 by means of gears 9 and 10. The driven shaft 8 is operatively associated with a caterpillar driving shaft 11 by means of gears 12 and 13. A clutch 14 having an actuating handle 15 is provided whereby a driven shaft 8 may be disassociated from the driving shaft 7. Brake or clutch means, not shown, may be provided having actuating handles 16 and 17 whereby the respective caterpillar tracks 5 and 6 may be controlled independently of each other. A frame 18 is rotatably mounted on the superstructure 3. The frame 18 is provided with a circular rack 19 fixedly connected therewith, said circular rack having cogs in the top face thereof. A pair of frame driving shafts 20 are mounted on bearing members 21. The bearing members 21 are fixedly mounted on the superstructure 3. An end of each of the frame driving shafts 20 is provided with a pinion 22 in mesh with the cogged rack 19. The other ends of the frame driving shafts 20 are operatively associated with the driving shaft 7 by means of gears 23 and 24, respectively. A clutch 25 is provided for moving the gear 24 out of mesh with the gears 23 whereby the frame driving shafts 20 are disassociated from the driving shaft 7.

Auxiliary frame portions 26 are provided which are hingedly connected at 27 with the frame 18. The auxiliary frame portions 26 may be provided with agricultural implements hingedly connected therewith as shown at 28 and 29. The auxiliary frame portions 26 are provided with roller or wheel members 30. The superstructure 3 is provided with an arcuate shaped or substantially semicircular rack 31 having downwardly extending or curved end portions 32.

From the foregoing description of the various parts of the device, the operation thereof may be readily understood. When it is desired that the device be used the clutches 14 and 25 are set so as to disassociate the drive shaft 7 from the driven shaft 8 and the frame driving shafts 20. The power plant 4 is first put into operation. The clutch 14 is then moved for operatively connecting the drive shaft 7 with the driven shaft 8 whereby the caterpillars 5 and 6 are put in motion for conveying the device to the location at which it is to be used. When the device is in the proper location the clutch 25 is then moved for operatively engaging the shaft 7 with the shafts 20 whereby said shafts 20 will be rotated for rotating the frame 18. As the frame 18 rotates the farm implements carried by the hinged frame portions 26 will engage the ground for preparing the same. When the tractor 1 is traveling in the direction of the arrow 33 and the frame 18 is rotating in the direction of the arrow 34, as shown in Figure 1, the implements carried by the hinged frame portions 26 will be in engagement with the ground only while the frame is rotating a semi-revolution, the semicircle described by said implements when in contact with the ground terminating at an imaginary line 35 drawn at right angles to the direction of travel. During this semi-revolution of the frame 18 the implements will be positioned at the rear of the imaginary line 35 with respect to the direction of travel of the tractor.

As the frame 18 continues its rotation the implements move in advance of the imaginary line 35 with respect to the direction of travel at which the rollers 30 engage and ride upon the rack 31 whereby the hinged frame portions 26 are moved upwardly for lifting the implements clear of the ground, said frame portions 26 being supported in their raised positions by the rack 31 for holding the implements out of engagement with the ground while said implements are moving through the other half of their semicircle which is in advance of the imaginary line 35 with respect to the direction of travel. Thus it will be seen that the implements are only in contact with the ground during a semi-revolution of the frame 18. On referring to Figure 1 it will be noted that the caterpillar track 6 is of greater length than the caterpillar track 5. When the implements are in engagement with the ground, such as the implement 28 shown in Figure 2, the resistance of the ground to the moving implements will be carried to the carriage through the medium of the toothed rack and gears which will tend to move the caterpillar track 5 in advance of the caterpillar track 6 and thereby tend to swing the tractor off the course of direction in which it is traveling. In other words the tendency to accelerate the caterpillar track 5 and retard the caterpillar track 6 would tend to make one of the tracks slip which would cause the tractor to turn. In order to avoid this the track 6 is made longer in order that it may have greater traction so that any slippage which occurs will be between the track 5 and the ground. The ratio of the forward movement of the tractor to the rotation of the frame is fixed only with respect to the caterpillar track 6, so that slippage of the track 5 will not affect the rotation of the frame 18. By having one caterpillar track long and the other short the tractor has what approximates a three point bearing surface whereby the frame 18 will remain most nearly parallel to the ground.

In Figure 2, I have shown a pair of the auxiliary frame portions 26 as being provided with a plow implement 28 and a disc harrow implement 29. It will readily be seen that other implements may be substituted in place of these and also that the remainder of the auxiliary frame portions may be provided with other implements which it is desired to use.

I claim:

1. An agricultural device comprising a supporting carriage, a rotator rotatably carried by the carriage, power means for rotating the rotator, an extending portion hingedly connected with the rotator and adapted for having an implement connected therewith, and means for moving the extending portion vertically when the rotator is rotated.

2. An agricultural device comprising a supporting carriage, a rotator rotatably carried by the carriage, power means for rotating the rotator, radially extending portions hingedly connected with the rotator and movable vertically, said extending portions having implements connected therewith, and positioned for having the implements in engagement with the ground for a portion of a revolution of the rotator, and cam means for moving the extending portions upwardly for positioning the implements out of engagement with the ground for a portion of the same revolution.

3. In an agricultural device, the combination of a transportable supporting carriage, power means for propelling the carriage, a rotator carried by the supporting carriage, means for operatively connecting the power means with the rotator, radially extending arms hingedly connected with the rotator and having their distal end portions provided with implements connected therewith, said arms being movable vertically and normally positioned for having the implements in engagement with the ground, and cam means for moving the arms upwardly for retaining the implements out of engagement with the ground for a portion of each revolution of the rotator.

4. In an agricultural device, the combination of a supporting frame, a rotator rotatably carried by the frame, an extending arm portion hingedly connected with the rotator and having an implement connected therewith, and a pair of transport units positioned on opposite sides of the supporting carriage for transporting the carriage, one of said units having a greater traction area than the other of said units for counteracting a swerving tendency of the carriage.

5. An agricultural device comprising a supporting carriage, a rotator carried by the carriage, power means for rotating the rotator, an extending portion hingedly connected with the rotator and having an implement connected therewith, a pair of transport units positioned on opposite sides of the supporting carriage for transporting the carriage, one of said units having a greater traction area than the other of said units for counteracting a swerving tendency of the carriage, and means for operatively connecting the transport units with the power means.

6. An agricultural device comprising a supporting carriage, a rotator carried by the carriage, power means for rotating the rotator, an extending portion hingedly connected with the rotator and adapted for having an implement connected therewith, means for moving the extending portion vertically when the rotator is rotated, a pair of transport units positioned on opposite sides of the supporting carriage for transporting the carriage, one of said units having a greater traction area than the other of said units for counteracting a swerving tendency of the carriage, and means for operatively connecting the transport units with the power means.

7. An agricultural device comprising a supporting carriage, a rotator rotatably carried by the carriage, power means for rotating the rotator, radially extending portions hingedly connected with the rotator and movable vertically, said extending portions having implements connected therewith, and positioned for having the implements in engagement with the ground for a portion of a revolution of the wheel means, cam means for moving the extending portions upwardly for positioning the implements out of engagement with the ground for a portion of the same revolution, a pair of transport units positioned on opposite sides of the supporting carriage for transporting the carriage, one of said units having a greater traction area than the other of said units for counteracting a swerving tendency of the carriage, and means for operatively connecting the transport units with the power means.

8. In an agricultural device, the combination of a transportable supporting carriage, power means for propelling the carriage, a rotator carried by the supporting carriage, means for operatively connecting the power means with the rotator, radially extending arms hingedly connected with the rotator and having their distal end portions provided with implements connected therewith, said arms being movable vertically and normally positioned for having the implements in engagement with the ground, cam means for moving the arms upwardly for retaining the implements out of engagement with the ground for a portion of each revolution of the rotator, a pair of transport units positioned on opposite sides of the supporting carriage for transporting the carriage, one of said units having a greater traction area than the other of said units for counteracting a swerving tendency of the carriage, and means for operatively connecting the transport units with the power means.

9. In an agricultural device, the combination of a portable supporting frame, a rotator carried by the frame and positioned above the same, means for rotating the rotator, extending portions hingedly connected with the rotator and having implements connected therewith, and means cooperating with the extending portions for moving the implements into and out of engagement with the ground when the rotator is rotated.

10. In an agricultural device, the combination of a portable supporting frame, a rotator carried by the frame, means for rotating the rotator, an extending portion hingedly connected with the rotator and having an implement connected therewith, means cooperating with the extending portion for moving the implement into and out of engagement with the ground when the rotator is rotated, transport members associated with the frame for supporting and transporting the same, and means operatively associated with the transport members for controlling the operation of one of the transport members independently of the other transport member.

11. In an agricultural device, the combination of a portable supporting frame, a rotator carried by the frame and positioned above the same, means for rotating the rotator, an extending portion hingedly connected with the rotator and having an implement connected therewith, means cooperating with the extending portion for moving the implement into and out of engagement with the ground when the rotator is rotated, transport members associated with the frame for supporting and transporting the same, and means operatively associated with the transport members for controlling the operation of one of the transport members independently of the other transport member.

12. In an agricultural device, the combination of a portable supporting frame, a rotator carried by the frame, power means for rotating the rotator, an extending portion hingedly connected with the rotator and having an implement connected therewith, means cooperating with the extending portion for moving the implement into and out of engagement with the ground when the rotator is rotated, transport members associated with the frame for supporting and transporting the same, means for operatively connecting the transport members with the power means, and means operatively associated with the transport members for controlling the operation of the transport members independently of each other.

13. In an agricultural device, the combination of a portable supporting frame, a rotator carried by the frame and positioned above the same, power means for rotating the rotator, a plurality of radially extending portions hingedly connected with the rotator, and having implements connected with the distal ends thereof, cam means cooperating with the extending portions for moving the same vertically whereby the implements may be moved into and out of engagement with the ground when the rotator is rotated, transport members associated with the frame for supporting and transporting the same, means for operatively connecting the transport members with the power means, and means associated with the transport members for controlling the operation of one of the transport members independently of the other transport member.

14. An agricultural device comprising a portable supporting frame, a rotator carried by the frame, means for rotating the rotator, an extending portion hingedly connected with the rotator and having an implement connected therewith, and means cooperating with the extending portion for moving the implement into and out of engagement with the ground when the rotator is rotated.

NAT ELMER BROWN.